United States Patent
Fernandez et al.

(10) Patent No.: US 10,578,704 B1
(45) Date of Patent: Mar. 3, 2020

(54) METHOD AND SYSTEM FOR LOCATING SIGNAL EMITTERS USING CROSS-CORRELATION WITH A RECONSTRUCTED WAVEFORM

(75) Inventors: Andrew D. Fernandez, San Jose, CA (US); Lawrence Dale Bennett, Mukilteo, WA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 476 days.

(21) Appl. No.: 12/533,331

(22) Filed: Jul. 31, 2009

(51) Int. Cl.
*G01S 5/06* (2006.01)
*G01S 5/02* (2010.01)
*G01S 5/00* (2006.01)

(52) U.S. Cl.
CPC .............. *G01S 5/06* (2013.01); *G01S 5/0009* (2013.01); *G01S 5/0081* (2013.01); *G01S 5/0221* (2013.01)

(58) Field of Classification Search
CPC .... G01S 5/0009; G01S 5/0081; G01S 5/0221; G01S 5/06
USPC ........................................ 342/387, 463, 465
See application file for complete search history.

(56) References Cited

U.S. PATENT DOCUMENTS

| | | | |
|---|---|---|---|
| 5,327,144 A * | 7/1994 | Stilp et al. | 342/387 |
| 6,201,499 B1 * | 3/2001 | Hawkes et al. | 342/387 |
| 7,239,876 B2 * | 7/2007 | Johnson et al. | 455/456.1 |
| 7,340,259 B2 * | 3/2008 | Maloney et al. | 455/456.1 |
| 7,869,810 B2 | 1/2011 | Cutler | |
| 9,035,762 B2 | 5/2015 | Cutler | |
| 2003/0198258 A1 * | 10/2003 | Jarske | G01S 5/021 370/519 |
| 2004/0203864 A1 * | 10/2004 | DiBuduo | H04W 64/00 455/456.1 |
| 2008/0031281 A1 * | 2/2008 | Ries | 370/491 |

OTHER PUBLICATIONS

Agilent Technologies, "Agilent N6841A RF Sensor for Signal Monitoring Networks", Data Sheet, Mar. 31, 2009.

* cited by examiner

*Primary Examiner* — Cassi J Galt

(57) ABSTRACT

A method and system determine a location of a signal emitter. A plurality of sensors each receives a signal transmitted by the signal emitter. One of the received signals is processed to produce a template describing an estimate of the signal transmitted by the signal emitter. The template is cross-correlated with at least some of the signals received at the sensors. At least one cross-correlation feature is identified from each cross-correlation and the cross-correlation features are used to determine the location of the signal emitter.

4 Claims, 14 Drawing Sheets

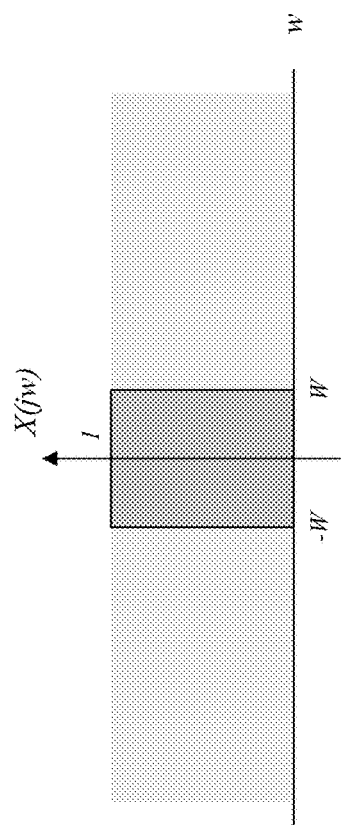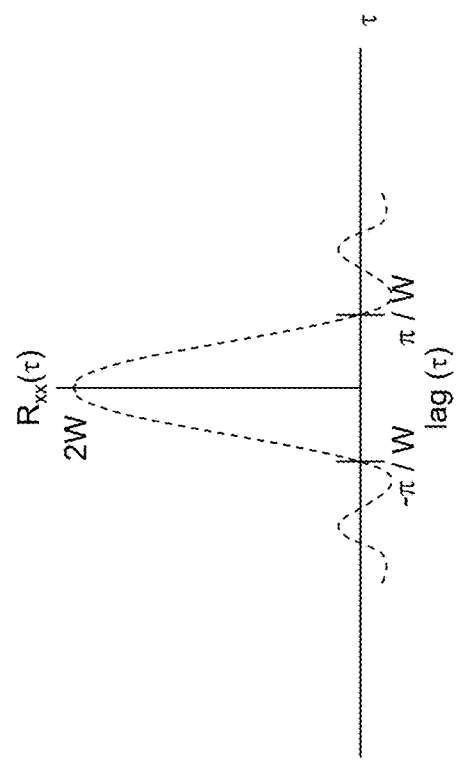

METHOD AND SYSTEM FOR LOCATING SIGNAL EMITTERS USING CROSS-CORRELATION WITH A RECONSTRUCTED WAVEFORM

BACKGROUND

There are a number of applications where it is desirable to geolocate an electromagnetic signal of unknown origin. For example, a corporate IT department may need to locate the source of an unauthorized wireless access point which compromises their network's security.

Of course precisely defining an object's location requires specifying coordinates in three dimensions (e.g., longitude, latitude, and altitude). In the discussion to follow, for simplicity of explanation it is assumed that the third coordinate (i.e., altitude) is either known or is otherwise easily determined once the other two coordinates (e.g., latitude and longitude) are identified. Those skilled in the art will be able to extrapolate the discussion to follow to the case where all three coordinates are to be determined.

There are several known methods to locate a signal emitter using a plurality of distributed sensors, or receivers, which are spaced apart from each other. Among these methods are: Angle of Arrival (AOA), Time Difference of Arrival (TDOA), and Received Signal Strength (RSS).

In the AOA method, the angle of arrival of the signal from a signal emitter is measured with special directional antennas at each receiver. This information is combined to help locate the signal emitter using lines of bearing. A chief limitation of the AOA method is that it requires special directional antennas at each receiver.

The TDOA method, also known sometimes as multilateration or hyperbolic positioning, is a process of locating an emitter by accurately computing the time difference of arrival at three or more sensors of a signal emitted from an emitter to be located. In particular, if a signal is emitted from a signal emitter, it will arrive at slightly different times at two spatially separated sensor sites, the TDOA being due to the different distances to each sensor from the emitter. For given locations of the two sensors, there is a set of emitter locations that would give the same measurement of TDOA. Given two known sensor locations and a known TDOA between them, the locus of possible locations of the signal emitter lies on a hyperbola. As shown in FIG. 1A, the hyperbola is defined as the locations where the difference between distances to the two sensors is a constant, or, in this case:

$$r_1 - r_2 = v(t_1 - t_2).$$

With three or more sensors, multiple hyperbolas can be constructed from the TDOAs of different pairs of sensors. The location where the hyperbolas generated from the different sensor pairs intersect is the most likely location of the signal emitter. In practice, the sensors are time synchronized and the difference in the time of arrival of a signal from a signal emitter at a pair of sensors is measured.

FIG. 1B illustrates some principles of a TDOA method of locating an emitter 105 using three sensors 110, 120 and 130. Shown in FIG. 1B are three range-defined hyperbolas 302, 304 and 306 for the three sensor pairs 110/120, 110/130 and 120/130. The location where the hyperbolas 302, 304 and 306 from the three sensor pairs intersect, as shown in FIG. 1B, is the most likely location of the signal emitter 105. In general, at least three sensors are required for the TDOA method, but more than three sensors can be employed.

In the RSS method, the power of the received signal at each sensor is measured, and the signal strength information is processed to help locate the signal emitter. There are a few different emitter location procedures that employ RSS.

In a basic RSS procedure, the power of the signal received at each sensor is measured. By knowing the broadcast power of the emitter, $P_0$, one can convert the received power level, $P_1$, to a range using the idealized expression: $P_1 = P_0 * r_1^{-2}$. Other variants of this equation use statistical approaches to account for varieties in terrain. The range from each sensor defines a circle of probable locations for the emitter, centered at that receiver. Another form of RSS is a relative power measurement, used when the power level of the signal transmitted at the emitter is not known. In this approach the relative signal power is measured at a pair of two sensors, and the received power levels at the sensors are processed to determine a circle of probable locations for the emitter.

A more detailed explanation of principles employed in such an RSS method of locating a signal emitter will now be provided with respect to FIG. 2.

FIG. 2 illustrates a general case of an emitter 105 and two sensors 110 and 120 which each receives a signal from emitter 105 wherein a circle 202 of probable locations for emitter 105 is determined from a ratio the received signal powers at sensors 110 and 120.

In free space, the received power of a signal transmitted by emitter 105 decreases with the square of the distance from emitter 105.

$$P_1 = P_0 \left(\frac{r_0}{r_1}\right)^2, \quad (1)$$

where $r_1$ is the distance between emitter 105 and sensor 110, and 2 is the exponential rate at which the power decreases with distance. The emitter transmit power is $P_0$, as measured at distance $r_0$ from the emitter. Likewise the received power $P_2$ at sensor 120 is:

$$P_2 = P_0 \left(\frac{r_0}{r_2}\right)^2, \quad (2)$$

where $r_2$ is the distance between emitter 105 and sensor 120. This leads to:

$$\frac{P_1}{P_2} = \left(\frac{r_2}{r_1}\right)^2 \quad (3)$$

With a bit of manipulation this yields:

$$\frac{\log(P_1) - \log(P_2)}{2} = \frac{r_2}{r_1} = const = \alpha \quad (4)$$

This method is sometimes referred to as Signal Attenuation Difference of Arrival (SADOA). It can be shown that this leads to the circle 202 (the so-called circle of Apollonius) of a given radius R and centered on a point $X_0$, $Y_0$ located on the line 201 defined by the two sensors 110 and 120. This relationship is illustrated in FIG. 2.

With at least three sensors (e.g., A, B & C), three such circles are generated from the corresponding three unique pairs of sensors (e.g., A/B, A/C & B/C), and the location of emitter 100 can be found where the three circles intercept.

Several error factors affect the accuracy of geolocation measurements made by the AOA, TDOA, and RSS techniques described above. These error factors may include:

Noise. In low Signal-to-noise ratio (SNR) situations, emitter location is more difficult to determine with a high degree of accuracy because measurements of signal power, time-difference-of-arrival, etc. are affected.

Timing and calibration errors. Although these errors are typically small compared to other errors described here, there is nevertheless a need for algorithms that are robust in instances where these errors are significant.

Co-channel interference. Signals from multiple emitters that overlap in time and frequency can lead to ambiguous results.

Multipath propagation. Reflections from multipath propagation can distort or obscure the true time difference of arrival, angle of arrival, or strength of a signal received at a sensor.

Blocked line-of-sight, or un-detected direct path (UDP), is a condition in which the main propagation path between the emitter and receiver is blocked.

In contrast to the AOA, TDOA and basic RSS methods described above, there are other emitter location methods that employ correlations of signals from two or more time synchronized sensors. If sensor A and sensor B are time synchronized with each other, then components of the signal received at each sensor that are similar will add constructively, while uncorrelated components such as noise do not add. The cross correlation approach can detect signals below the noise floor through the processing gain of the correlation operation.

To illustrate the point, consider the two discrete valued signals, x(k) and y(k) received at time synchronized sensors A and B. The cross correlation of x(k) and y(k), $R_{xy}$, is defined by equation (5) below.

$$R_{xy}[n] = \lim_{N \to \infty} \frac{1}{N} \sum_{k=0}^{N-1} x*[k]y[k+n] \quad (5)$$

We represent x(k) as the sum of a scaled original emitted signal p(k) plus an unwanted noise term, $n_A(k)$. We represent y(k) as the sum of a scaled and delayed original signal p(k) plus a different noise term, $n_B(k)$. The delay between sensor A and sensor B is represented by δ. The noise terms originate from internally generated receiver noise, hence two receivers may have the same noise performance, same noise statistics, and even the same root cause (e.g. thermal), but the noise signals themselves will be uncorrelated. This is illustrated in Equation (6).

$$x[k]=A \cdot p(k)+n_A(k)$$

$$y[k]=B \cdot p(k-\delta)+n_B(k) \quad (6)$$

Substituting equation (6) into equation (5) yields equation (7).

$$R_{xy}[n] = \lim_{N \to \infty} \frac{1}{N} \left[ \sum_{k=0}^{N-1} ABp^*(k)p(k-\delta+n) + \right. \quad (7)$$

$$\left. Ap^*(k)n_B(k+n) + Bp(k-\delta+n)n_A^*(k) + n_A^*(k)n_B(k) \right]$$

According to equation (7), $R_{xy}$ peaks when n equals δ, which is when the cross correlation lag is equal to the delay between sensor A and sensor B. If we allow that both noise terms are uncorrelated, and that the signal, p(k), is uncorrelated with noise, then the last three terms of the expression tend to diminish relative to the first term with increasing N. In other words, the longer a signal is observed, the more likely it is that it can be separated from the noise.

One example of a method which employs cross correlating the captured signal at different sensors or receivers is the Time Difference of Arrival from Cross Correlation method.

In many cases, the time-difference of arrival of a signal at two sensors is difficult to measure since the timing and signal characteristics of the emitter are unknown. In those cases, cross-correlation is a common method for determining the delay T. FIG. 1C shows an example cross-correlation curve 310. The time-difference of arrival between the two sensors is estimated as the location 312 where the curve 310 has its maximum. In practice, the cross-correlation curve is more complex and contains multiple features. These features may be pertinent to more sophisticated geolocation algorithms whose description is outside the scope of this application.

Meanwhile, U.S. patent application Ser. No. 12/325,708 filed on 1 Dec. 2008 describes a method and system for locating signal emitters using cross-correlations of received signal strengths (RSS) between pairs of sensors, and more specifically, ratios of cross-correlations of signal magnitudes from pairs of sensors including a common sensor in each pair. U.S. patent application Ser. No. 12/325,708 is incorporated herein by reference in its entirety for all purposes as if fully set forth herein.

However, there are some issues with these systems that use cross-correlations of the received signals. First, the cross correlation peak of two signals with significant multipath, noise, and interference has more ambiguity in time difference and amplitude than the noise free and multipath free case. Multipath can cause multiple peaks or overlapping peaks in the cross correlation function. It can make the estimate of time difference ambiguous. It would be better to cross correlate the received signal with an exact replica of the original transmit signal. Unfortunately, the original transmit signal is often unknown and unavailable for cross-correlation. Second, time domain data acquired at each sensor must be shared with other sensors or with a central processor to generate the cross correlations between all sensor pairs. Unfortunately in some cases the communication bandwidth between sensors is limited, and therefore transmitting a full time record of the signal received at each sensor to a central controller and/or to other sensors for cross-correlation can take a prohibitively long time.

What is needed, therefore, is a method and system for locating signal emitters that addresses one or more of these issues.

SUMMARY

In an example embodiment, a method is provided for determining the location of a device that emits a signal. The method includes: receiving at each of a plurality of sensors a received signal corresponding to a signal transmitted by the signal emitter; processing one of the received signals received at one of the sensors to produce a template describing an estimate of the signal transmitted by the signal emitter; cross-correlating the template with at least some of the signals received at the sensors; identifying at least one cross-correlation feature from each cross-correlation; and using the cross-correlation features to determine the location of the signal emitter.

In another example embodiment, a system determines a location of a device that emits a signal. The system comprises: a plurality of sensors separated and spaced apart from each other and each configured to receive a received signal corresponding to a signal transmitted by the signal emitter; and one or more processors configured collectively to process one of the received signals received at one of the sensors to produce a template describing an estimate of the signal transmitted by the signal emitter, to cross-correlate the template with at least some of the received signals received at the sensors; to identify at least one cross-correlation feature from each cross-correlation, and to use the cross-correlation features to determine the location of the signal emitter.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 9A shows a plot of the power spectrum of a bandlimited signal.

FIG. 9B shows the plot of an autocorrelation function of a bandlimited signal.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Figures 1A, 1B:
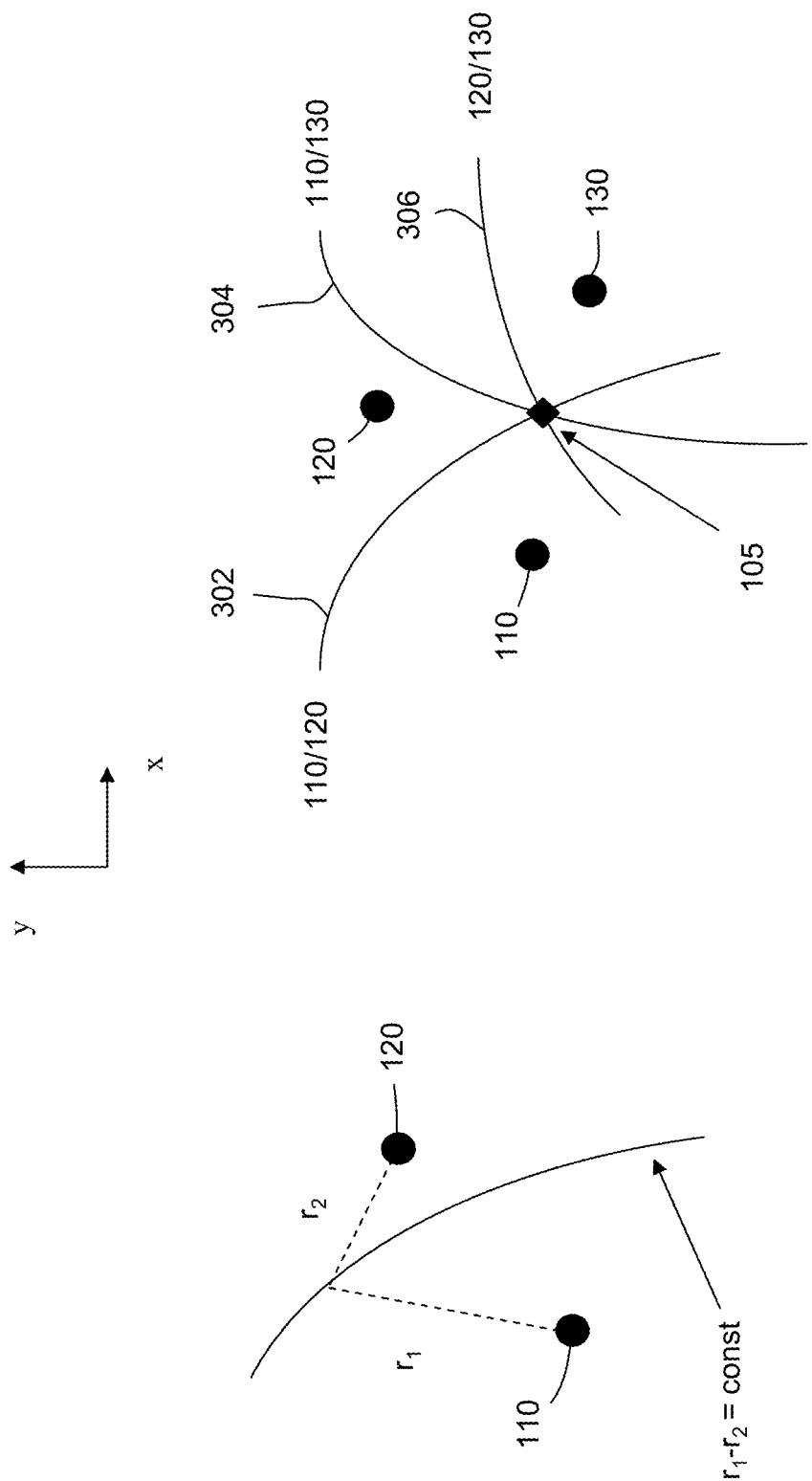
FIGS. 1A-C illustrate principles of a time difference of arrival (TDOA) algorithm for determining the location of a signal emitter.
Figure 1C:
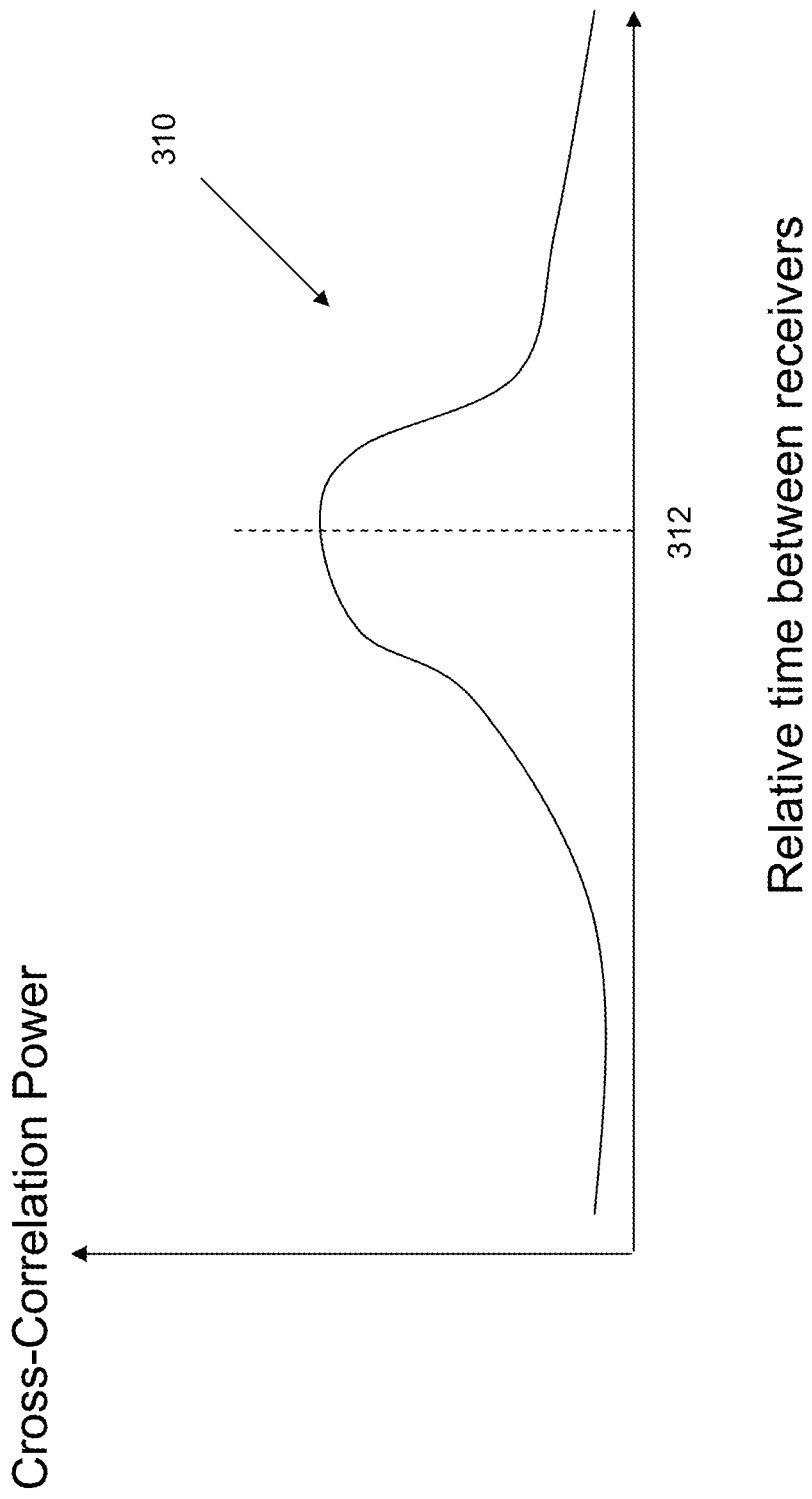
Figure 2:
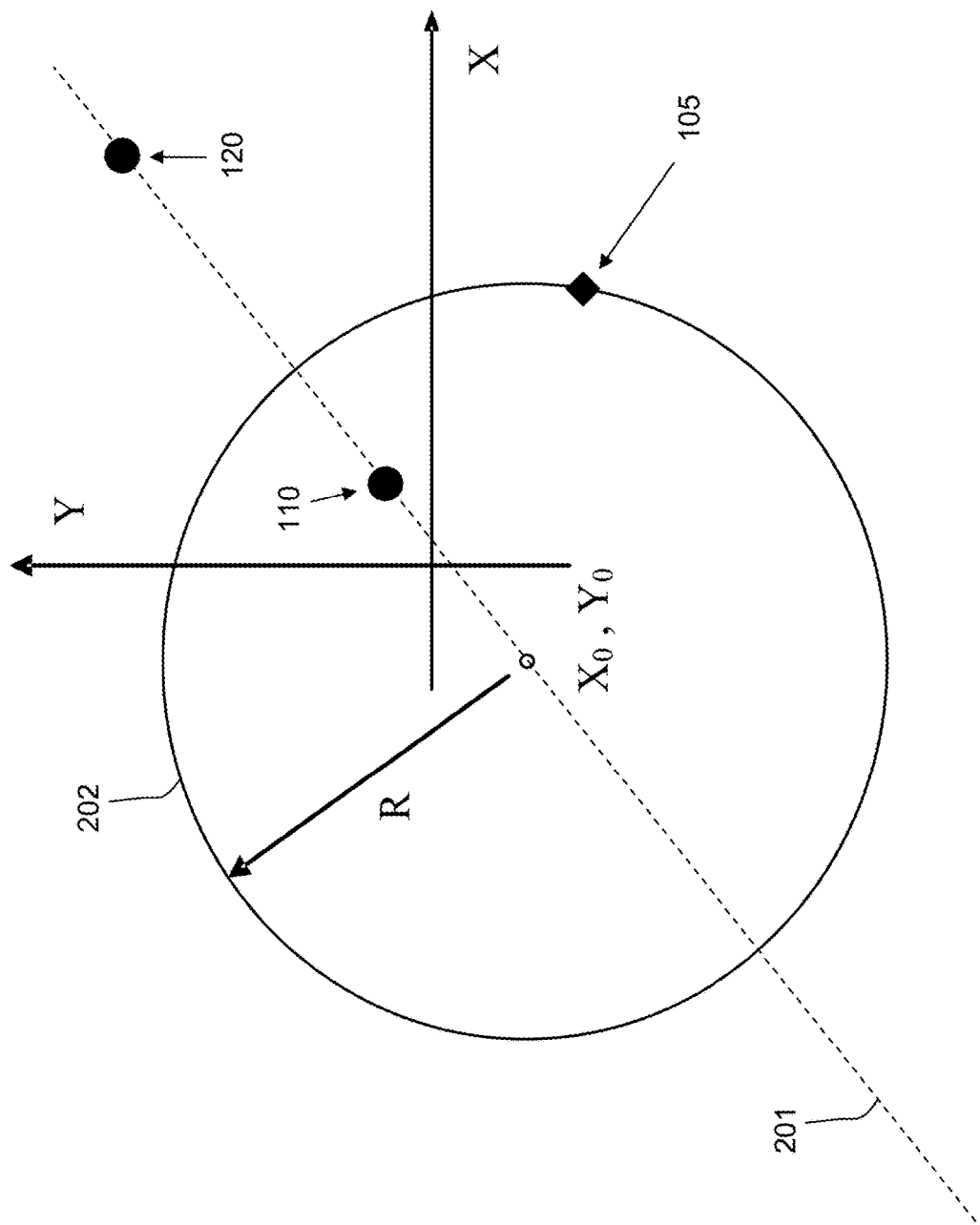
FIG. 2 illustrates principles of a received signal strength (RSS) algorithm for determining the location of a signal emitter.
Figure 3:
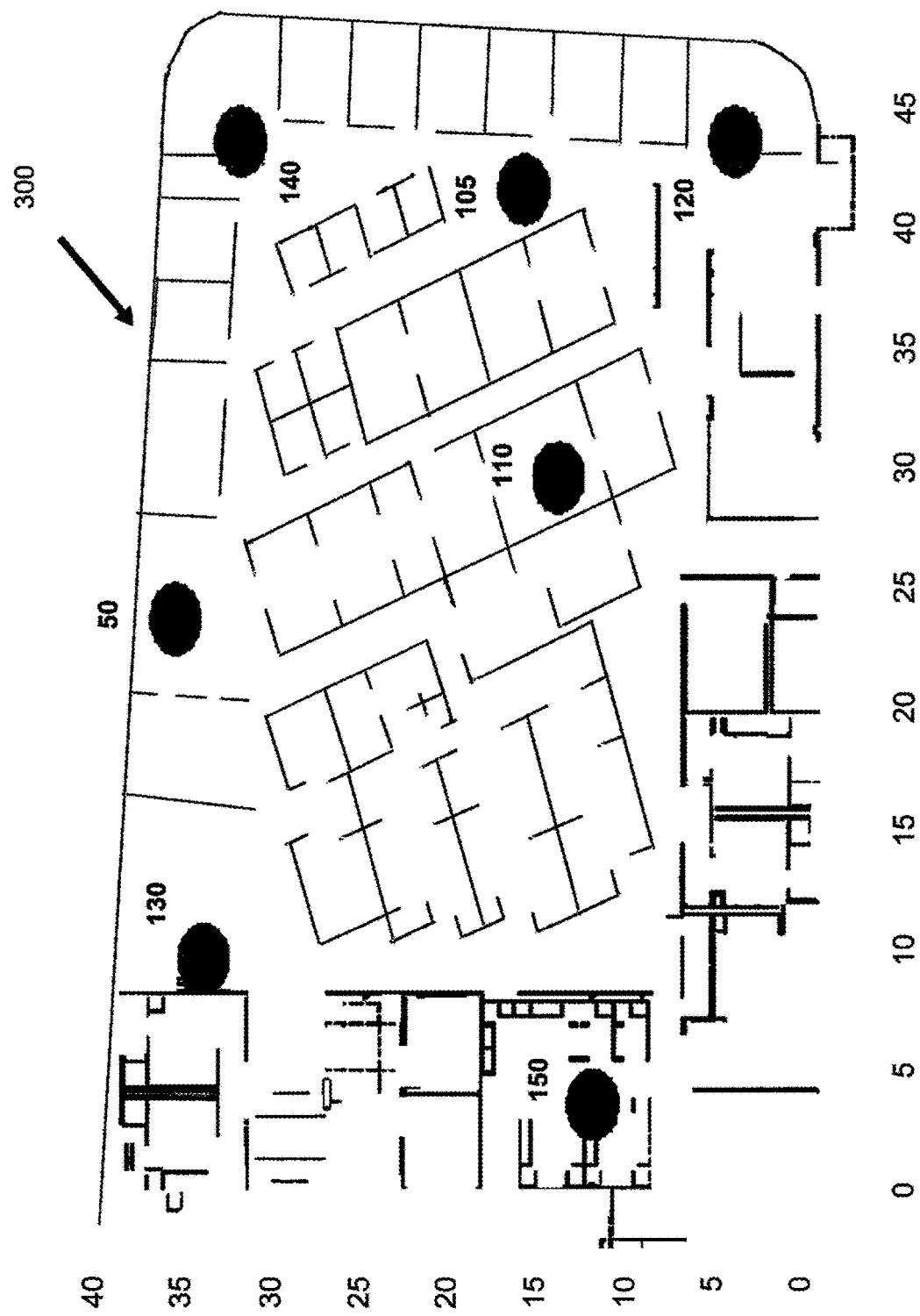
FIG. 3 illustrates an exemplary building floor-plan and a sensor layout for one embodiment of a system for locating a signal emitter.
Figure 4:
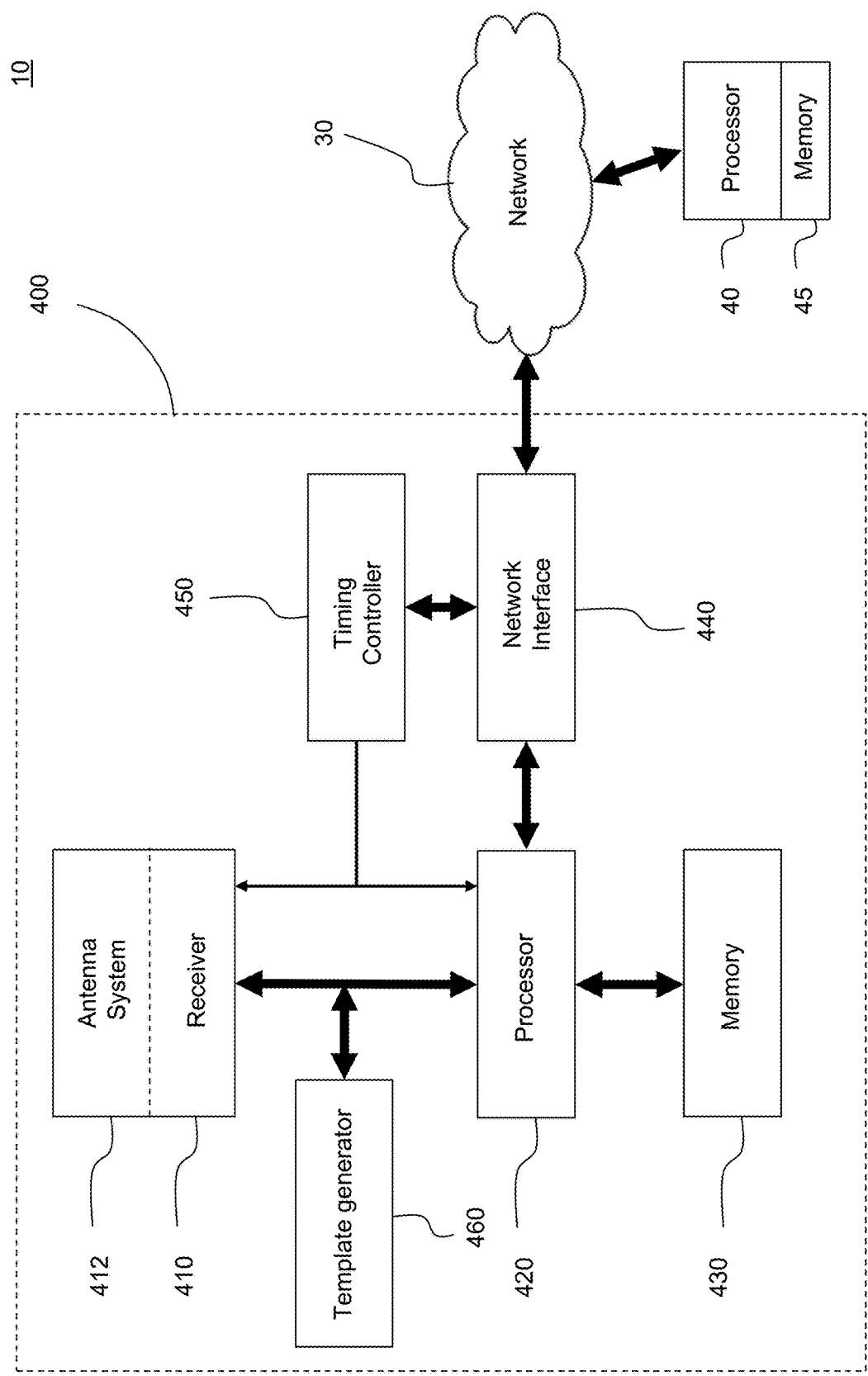
FIG. 4 illustrates a functional block diagram of one embodiment of a sensor that may be employed in a system for locating a signal emitter.

FIG. 4 illustrates an exemplary building floor-plan and sensor layout for one embodiment of a geolocation system 400 for locating signal emitters. FIG. 3 shows a building including a signal emitter 105 at an unknown location. A system 400 for locating signal emitter 105 includes a plurality of sensors 110, 120, 130, 140 and 150 and a common or central controller or processor 50. In a beneficial arrangement, sensors 110, 120, 130, 140 and 150 are all synchronized in time with each other via a communication network in which they all participate. In some embodiments of the system for locating signal emitters, central controller 50 may be eliminated, and one or more of the sensors 110, 120, 130, 140 and 150 may perform the operations of the central controller, as described in greater detail below. In the arrangement shown in FIG. 3, signal emitter 105 is assumed to operate and transmit independently of the communication network mentioned above, and therefore its transmissions are not externally time synchronized with sensors 110, 120, 130, 140 or 150, or with the central controller 50. In operation, some or all of the sensors 110, 120, 130, 140 and 150 receive a signal (e.g., an RF signal) emitted by signal emitter 105 "over-the-air" which, depending on the relative locations of signal emitter 105 and each sensor and the features of the building and its contents, may include a direct or line-of-sight path, and one or more "multipath" reflections.

Through various techniques such as AOA, TDOA, RSS, etc. as described above, system 400 may process the signals received at sensors 110, 120, 130, 140 and 150 to determine the unknown location of signal emitter 105. As noted above, in some of the preferred methods, signals received at two or more sensors 110, 120, 130, 140 and 150 are cross-correlated to obtain the desired parameters which are employed for locating signal emitter 105.

However, as also noted above, there are some issues with these systems that use cross-correlations of signals received at different sensors. First, in some cases, the signals received at one or more of the sensors due to signal emitter 105 may be substantially compromised or corrupted due to noise and/or multipath propagation and/or other interference. In some cases, the received signal may be so impaired that, by itself, it is difficult or impossible to resolve the timing or amplitude of the originally-transmit signal. Furthermore, the cross correlation peak of two such received signals with significant multipath, noise, and interference has significant ambiguity in time and amplitude and may be in some cases unusable. Second, in cases where the communication bandwidth of the communication network for sensors 110, 120, 130, 140 and 150 is limited, transmitting a full time record of the signal received at each sensor to central controller 50, or to another sensor, for cross-correlation can take a prohibitively long time.

To clarify the first issue, we present a model for the transmit signal, radio channel, and received signal. For clarity, we ignore the effects of noise and interference. It is often convenient to model a communications signal as a bandlimited stationary Gaussian process. FIG. 9A shows the power spectrum of bandlimited signal, and FIG. 9B shows a plot of $R_{xx}$, the autocorrelation function of a bandlimited signal x(t). It is also convenient to model a wireless communications channel as a linear filter. The delay profile of multipath channel is analogous to the channel's impulse response. The frequency domain fading profile is analogous to the channel's frequency response.

Figure 10:
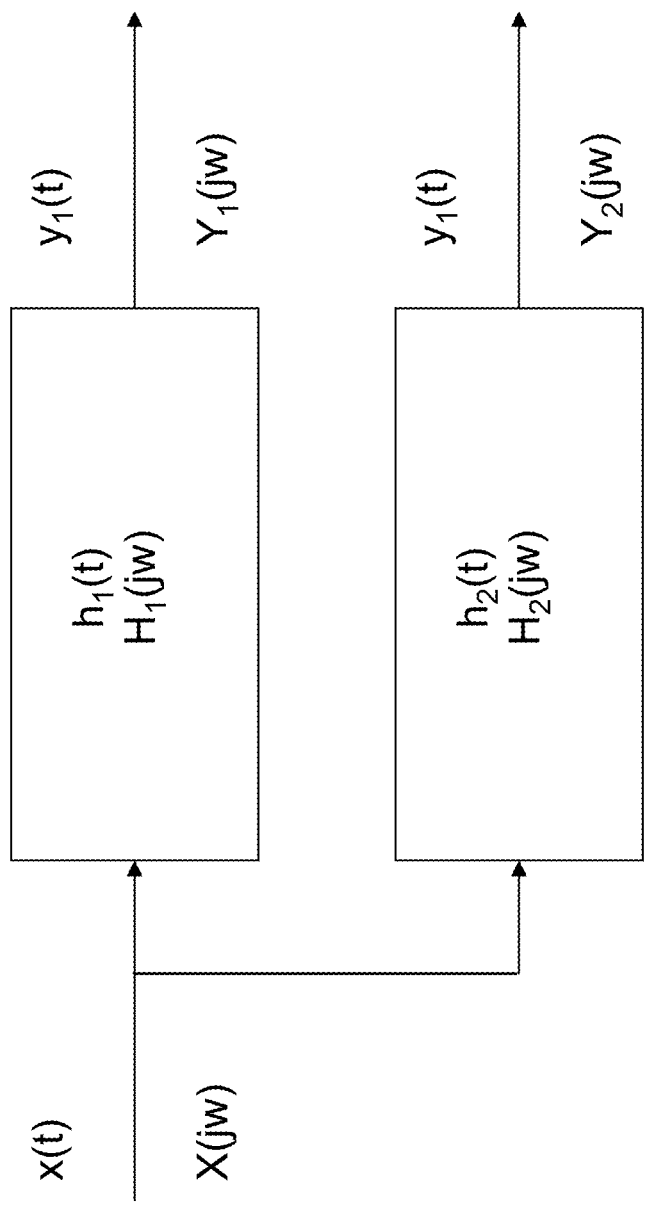
FIG. 10 illustrates a transmit signal that is received at two distinct locations where each received signal has undergone a different multipath propagation environment.

Consider the cross correlation of a transmit signal that is received at two distinct locations. Each received signal has undergone a different multipath propagation environment. We treat each channel as distinct. FIG. 10 shows an illustrative block diagram, where:

$$y_1(t) = x(t) * h_1(t) \quad (8a)$$

$$y_2(t) = x(t) * h_2(t) \quad (8b)$$

The autocorrelation function of the received signal is:

$$R_{yy}(\tau) = y_1(t) \otimes y_2(t) \quad (9a)$$

$$R_{yy}(\tau) = [x(t) * h_1(t)] \otimes [x(t) * h_2(t)] \quad (9b)$$

Using the associative property of convolution and correlation and the relationship between correlation and convolution we can re-write the autocorrelation of the outputs as:

$$R_{y1y2}(\tau) = R_{xx}(\tau) * R_{h_1h_2}(\tau) \quad (10)$$

Substituting for $R_{xx}$ we have the following expression for the cross-correlation of a bandlimited signal at the output of a linear channel with the same bandlimited signal at the output of a different linear channel:

$$R_{y1y2}(\tau) = \frac{2\sin(W\tau)}{\tau} * [h_1(t) \otimes h_2(t)] \quad (11)$$

where W is one half the signal bandwidth in radians (W=0.5*2π*BW).

Figure 11A:
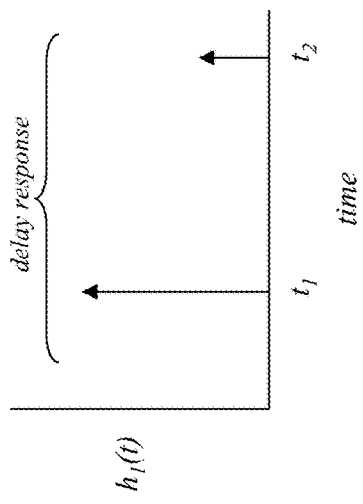
FIGS. 11A-B illustrate two exemplary impulse responses for two different channels with two different multipath propagation characteristics.
Figure 11B:
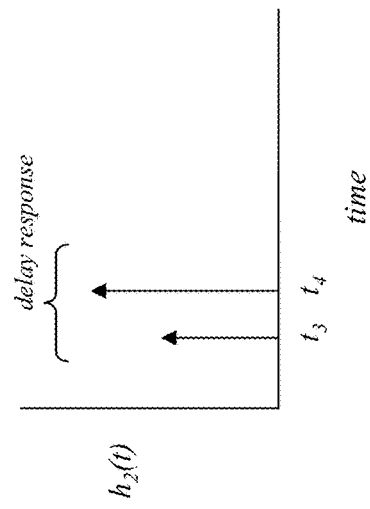

For illustration, we represent $h_1(t)$ and $h_2(t)$ by the two impulse responses as shown in FIGS. 11A-B.

Figure 12:
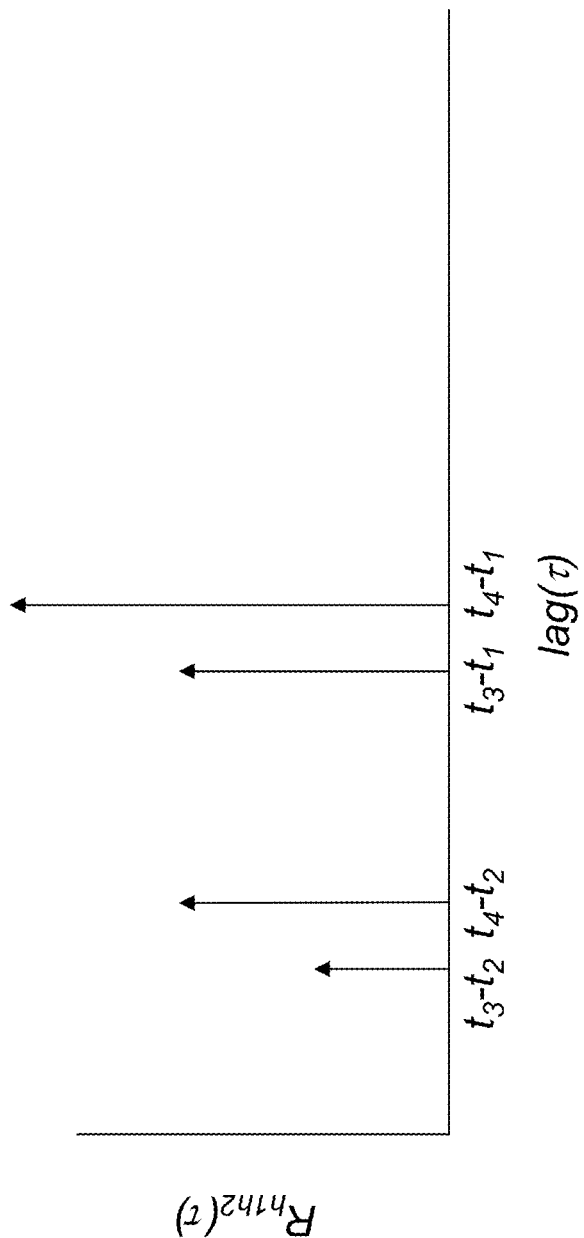
FIG. 12 shows the cross correlation of the two channel impulse responses illustrated in FIGS. 11A-B.

FIG. 12 shows the cross correlation of the two channel impulse responses. We refer to this as the "cross-channel impulse response function". By our definition of correlation, a graphical way to reach this function is to take the channel 1 response and shift it left for negative tau and compute the overlap at each shift. This is equivalent to shifting channel 2 right for negative tau and computing the overlap at each shift. Notice that the cross correlation of two distinct channels is not guaranteed to be even.

Notice that the correlation of two impulse responses is simply another collection of impulses.

$$h_1(t) = \sum_i a_i^1 \delta(t - t_i^1) \quad (12a)$$

$$h_2(t) = \sum_i a_i^2 \delta(t - t_i^2) \quad (12b)$$

$$R_{h_1h_2}(\tau) = h_1(t) \otimes h_2(t) = \sum_i a_i \delta(\tau - \tau_i) \quad (12c)$$

The final result $R_{y1y2}$ is achieved by convolving the two correlations above: $R_{hh}$ with $R_{xx}$. Convolving these impulse responses with $R_{xx}$ results in $R_{xx}$ copied, time shifted, and scaled by each impulse in $R_{hh}$ yields:

$$R_{y1y2}(\tau) = \frac{2\sin(W\tau)}{\tau} * \left[ \sum_i a_i \delta(\tau - \tau_i) \right] \quad (13a)$$

$$R_{y1y2}(\tau) = \sum_i \frac{2a_i \sin(W(\tau - \tau_i))}{(\tau - \tau_i)} \quad (13b)$$

Figure 13:
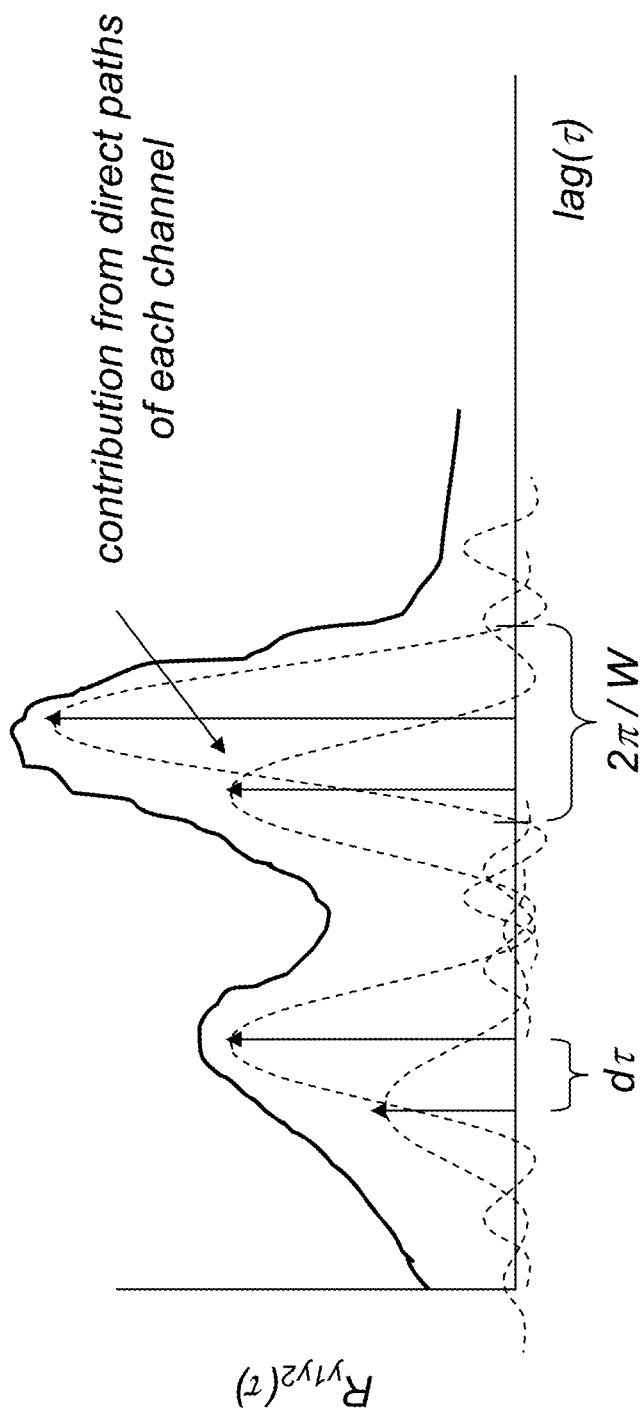
FIG. 13 illustrates the cross correlation of signals received at two different sensors via two different channels with two different multipath propagation characteristics.

FIG. 13 illustrates the cross correlation of received signals y1 and y2.

We arrive at a spreading function, $R_{xx}$, that is convolved with a set of impulses. It becomes apparent that the largest peak in $R_{12}$ is determined by the time offset corresponding to the difference between (in many cases) the largest impulse of each channel. If this largest impulse doesn't correspond to the direct path, then the cross correlation function does not peak at the direct path. In geolocation applications, we rely on the constructive interference from information in other cross correlation pairs to accentuate the direct path and suppress the false peaks from indirect paths.

The cross channel impulse response contains the relevant TDOA information, and is obscured by the spreading function which is signal dependent. The cross channel impulse response is complicated by the correlation of two channels, both containing multipath. If instead, we used an ideal template waveform as one of the two correlated signals, the cross channel impulse response would reduce to the channel impulse response of the received signal. This in turn would decrease the number of peaks in the signal-template cross correlation and make the time offset and amplitude of the peak corresponding to the direct path easier to estimate.

The ability to resolve each peak depends largely on the ratio of pi/W, the reciprocal half bandwidth, to dτ, the minimum spacing between each peak of the channel cross correlation. We shall refer to dτ as delay separation. W is one half the signal bandwidth in radians (W=0.5*2π*BW). Equivalently, we may compare 1/BW to dτ, where BW is bandwidth in Hz. If the reciprocal bandwidth is large relative to the delay separation, then multipath is difficult to resolve. If the reciprocal bandwidth is small relative to delay separation, multipath becomes easy to resolve. If for example, the template waveform were used in place of $y_2(t)$, then $h_2(t)$ would be ideally a single delta function. The resulting cross channel impulse response would have a much larger delay separation, equivalent to that of $h_1(t)$, and hence the peaks would be easier to resolve.

For the channel impulse response, the earliest impulse is the direct path. Unfortunately, there is no corresponding analogy to search for the direct path among many smaller peaks in the cross correlation of $y_1(t)$ and $y_2(t)$. However, in the case of cross correlation of the received signal with a template, the earliest impulse is indeed the direct path. This too improves our ability to estimate the time offset and amplitude of the peak corresponding to the direct path.

Regarding the first issue, if one could cross-correlate a highly-compromised received signal at a sensor with an ideal, uncompromised, copy of the original signal transmitted by signal emitter 105, in may cases we would obtain useful results through the processing gain of the correlation with a more perfect replica of the transmit signal. Using such a replica, co-channel interference and multipath effects are diminished relative to the general case. Unfortunately, as noted above, in the general case the exact signal emitted by signal emitter 105 is unknown at the sensors.

To address the first issue, in a beneficial embodiment, system 400 utilizes what is believed to be a clear "observation" of the originally-transmitted signal—that is, a version of the originally-transmitted signal that is received at a "first" sensor and is believed to be relatively free of noise, interference, and multipath effects compared to observations at other sensors. A clear observation for the purpose of this technique is one which is clear enough that the modulation type may be recognized and the signal demodulated. System 400 uses this observation to generate a model or template describing an estimate of the signal originally transmitted by the signal emitter, and correlates the signal received at each of the other "second" sensors with this template. In a beneficial arrangement, system 400 uses the best observation from among the sensors 110, 120, 130, 140 and 150 to create the template. The template is the best estimate of the original signal, and ideally is free from multipath, noise, and interference. For known signal formats (those where a priori knowledge about the transmitter, modulation scheme, or coding is available), such additional information can be used to impose constraints on the received signal that help improve estimation of the original transmit signal apart from the multipath, noise, and interference present in even the clearest observation. In many cases, the "first sensor" will be the sensor that receives the signal from signal emitter 105 first. The first sensor may trigger the other "second" sensors in system 400 to geolocate.

To address the second issue, in a beneficial embodiment the first sensor processes the received signal to generate a template, or information for generating the template. Then, instead of communicating samples of the waveform itself that is received at the first sensor, the first sensor only communicates the template, or information sufficient for reconstructing the template, which has a much lower communication bandwidth requirement than communicating samples of the received waveform itself.

Further details of these features will be explained below with respect to FIGS. 4-8.

FIG. 4 shows a functional block diagram of one embodiment of a sensor 400 that may be employed in system 400 for locating signal emitters. As will be appreciated by those skilled in the art, one or more of the various "parts" shown in FIG. 4 may be physically implemented using a software-controlled microprocessor, hard-wired logic circuits, or a combination thereof. Also, while the parts are functionally segregated in FIG. 4 for explanation purposes, they may be combined variously in any physical implementation.

Sensor 400 includes a receiver 410, a processor 420, a memory 430, a network interface 440, a timing controller 450, and a template generator 460. In some embodiments, receiver 410 includes, or is connected to, an antenna system 412. In some embodiments, antenna system 412 may comprise a directional antenna system.

Receiver 410 provides functionality for sensor 400 to receive and process a signal (e.g., an RF signal, a microwave signal, an acoustic signal, etc.) received from a signal emitter. In some embodiments, receiver 410 is able to simultaneously receive signals from a plurality of different signal emitters.

Processor 420 is configured to execute one or more software algorithms in conjunction with memory 430 to provide functionality for sensor 400. Beneficially, processor 420 includes its own memory (e.g., nonvolatile memory) for storing executable software programming code that allows it to perform the various functions of sensor 400. Alternatively, or additionally, executable code may be stored in designated memory locations within memory 430.

Memory 430 stores data and/or software programming code used in operations of sensor 400.

Network interface 440 interfaces sensor 400 to a network 30 that includes a plurality of other sensors 400. By means of network 30, sensors 400 may share or communicate information with each other, and/or to a processor 40 and/or associated memory 45 that may be connected via network 30. Processor 40 and memory 45, together with associated communication components such as a network interface (not shown in FIG. 4) may comprise a central controller for system 400, such as central controller 50 shown in FIG. 3. Network 30 may be a wired or wireless network and may use any convenient communication protocol.

Timing controller 450 controls the timing of signal processing operations in sensor 400. In a beneficial arrangement, sensor 400 shares timing information with other sensors (not shown in FIG. 4) in network 30 via network interface 440. In one embodiment, timing controllers 450 of sensors 400 in network 30 are synchronized with each other to have a common sense of time. In one embodiment, timing controllers 450 in sensors 400 may obtain a common sense of time via a precision timing protocol (PTP) of IEEE-1588. In such a case, central controller 50 may include a master clock for sensors 400 in network 30, or a separate dedicated master clock may be provided in network 30. In another embodiment, one of the timing controllers 450 in one of the sensors 400 may operate as a master clock for other sensors 400 in network 30.

Template generator 460 generates a template describing an estimate of the signal originally transmitted by a signal emitter such as signal emitter 105 in FIG. 4. In some embodiments, template generator 460 will generate the template from a signal received at sensor 400 and processed by receiver 410 of sensor 400. In other embodiments, template generator 460 will generate the template from information received by sensor 400 from another sensor or from a central controller such as controller 50 shown in FIG. 4. In that case, the template will be generated based on a signal received by another sensor that has a better observation of the original transmitted signal.

Figure 5:
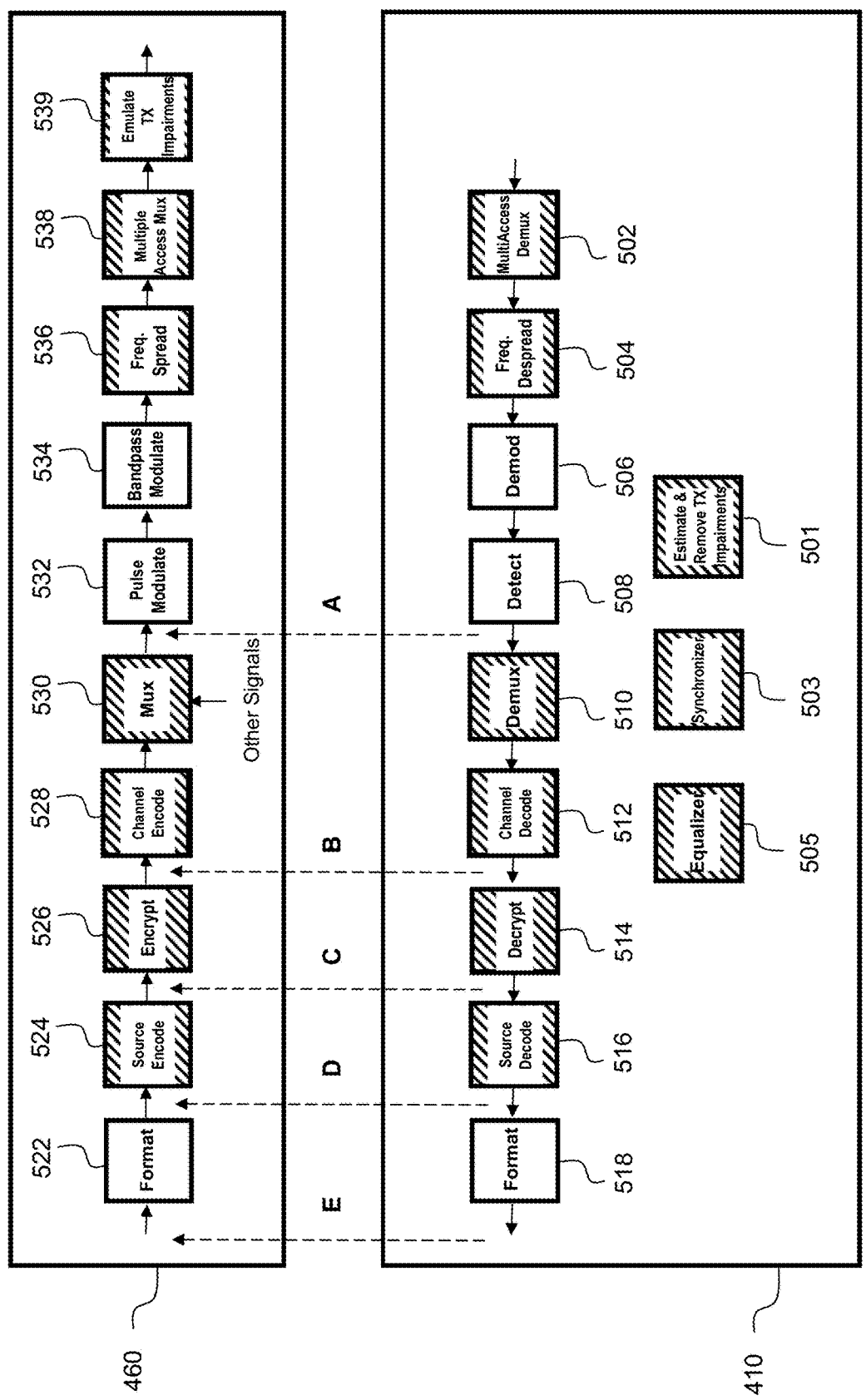
FIG. 5 is a more detailed functional block diagram illustrating embodiments of some components of one embodiment of a sensor that may be employed in a system for locating a signal emitter.

FIG. 5 is a more detailed functional block diagram illustrating embodiments of receiver 410 and template generator 460 of sensor 400. Receiver 410 includes a multiple access demultiplexer block 502, a frequency despreader 504, a demodulator 506, a detector 508, a demultiplexer 510, a channel decoder 512, a decrypter 514, a source decoder 516 and a formatter 518. Also shown in FIG. 5 are a block 501 for estimating and removing transmitter impairments, a synchronizer 503 and an equalizer 505. These blocks are shown as floating or disconnected in FIG. 5 because the position and implementation of these functions vary according to a specific receiver implementation, and they often interact with several other blocks in receiver 410.

Synchronizer 503 encompasses carrier tracking and symbol timing recovery loops commonly implemented in digital receivers to synchronize their signal processing with the transmitter's carrier frequency and symbol timing. Without carrier tracking, a receiver will have difficulty "locking" onto the I/Q constellation of the transmit signal, and be subject to carrier cycle slips. When this occurs, the phase of the reference carrier changes with respect to the received signal. The two carriers take a new relative phase to each other and this changed phase reference point results in misinterpretation of symbols in the constellation. Without symbol timing recovery, the demodulated bits will occasionally have errors known as bit slips. These bit slips are insertions or omissions in the transmit bit stream that arise from the local symbol clock running either too fast or too slow relative to the transmit symbol clock.

Equalizer 505 attempts to compensate for a non-ideal linear channel by imposing known constraints on the received signal. Those constraints may come from decoded bits, the modulation type, or information embedded in the transmit signal by the transmitter for the purpose of characterizing the radio channel. For example, if the transmit signal is known to be QPSK, then the received signals, after equalization, are expected to map to the 4 constellation points associated with QPSK. The equalization process is often implemented as an adaptive filter whose taps are adapted to best meet the imposed constraints.

FIG. 5 shows a generalized version of an embodiment of receiver 410. In most embodiments, one or more of the functional blocks of the embodiment of receiver 410 shown in FIG. 5 are omitted. Functional blocks may be omitted because the signals of interest to be detected do not require these functional blocks for reception, and/or because sensor 400 will not be able to obtain the information about the signal that is necessary to operate the block properly to process the signal, and/or to reduce cost and complexity. For example, in many cases the transmitted signals of interest are not multiplexed with other signals, and in that case, multiple access demultiplexer 502 could be omitted. Similarly, in many cases the transmitted signals of interest are not frequency spread, and in that case, the frequency despreader 504 could be omitted. In cases where transmitter impairments, such as I/Q imbalance or amplifier nonlinearity, can be characterized, this block is included. In particular, the functional blocks shown in cross-hatched shading in FIG. 5 are omitted in many embodiments.

Template generator 460 includes formatter 522, source encoder 524, encrypter 526, channel encoder 528, multiplexer 530, a pulse modulator 532, a bandpass modulator 534, a frequency spreader 536, a multiple access multiplexer 538, and a block 539 for applying transmitter impairments to the signal. In most embodiments, one or more of the functional blocks of the embodiment of template generator 460 shown in FIG. 5 are omitted. Functional blocks may be omitted because the signals of interest to be reconstructed do not use these functional blocks, and/or because sensor 400 will not be able to obtain the information about the signal that is necessary to operate the block properly to process the signal, and/or to reduce cost and complexity. For example, in many cases the transmitted signals of interest are not multiplexed with other signals, and in that case, multiple access multiplexer 538 could be omitted. Similarly, in many cases the transmitted signals of interest are not frequency spread, and in that case, the frequency spreader 536 could be omitted. In particular, the functional blocks shown in cross-hatched shading in FIG. 5 are omitted in many embodiments.

In some embodiments, some or all of the functional blocks of receiver 410 and/or template generator 460 may be performed by a processor (e.g., a digital signal processor) configured to execute one or more algorithms in accordance with programming instructions stored in a memory device.

In the example and description to follow, it is assumed that sensor 120 has a good observation of signal emitter 105, and the signal received by sensor 120 is used to generate the model or template describing an estimate of the signal originally transmitted by the signal emitter 105. A good observation for the purpose of this technique is one which is sufficiently clear that the modulation type may be recognized and the signal demodulated. Accordingly, sensor 120 is referred to below as the "first" sensor to distinguish to from the other sensors 110, 130, 140 and 150 which are referred to as "second sensors." It should be understood that there is nothing inherently different about first sensor 120 than the "second" sensors 110, 130, 140 and 150. In system 400, any one of the sensors can be the "first" sensor for detecting the unknown location of a signal emitter, if that sensor receives a good (or, beneficially, the "best") observation of the transmitted signal from signal emitter 105 and is used to generate the template. Each of the sensors 110, 120, 130, 140 and 150 cross-correlate their received signals with the template to produce data which may be used in a geolocation algorithm.

Now a method of locating signal emitters using a system such as system 400 with sensors such as sensor 400 will be explained.

First sensor (e.g., sensor 120) receives the transmitted signal from signal emitter 105. As explained above, in a beneficial arrangement first sensor 120 is a sensor which receives the signal transmitted by the signal emitter 105 with relatively little noise and interference, compared to some or all of the other "second" sensors 110, 130, 140 and 150. Even more beneficially, the first sensor (e.g., sensor 120) will be the sensor which has the best observation of the transmitted signal, which in many cases will be that sensor which receives the signal from signal emitter 105 first.

Next, first sensor 120 proceeds to demodulate the received signal and detect the transmitted symbols. In some embodiments, the demodulation process includes a frequency downconversion step. The term "symbols" typically refers to unmodulated data in digital communications systems. To demodulate, sensor 400 must determine the modulation format (e.g., QPSK; N-QAM; 8-VSB, etc.) of the transmitted signal, and perform a corresponding demodulation operation on the received signal via demodulator 506 of receiver 410. In one embodiment, first sensor 120 processes the received signal and determines the modulation format from characteristics of the received signal. In another embodiment, sensor 120 receives an analog communications signal. Such a signal is produced by analog modulation (e.g. AM or FM) of an information signal which is a time varying voltage. The sensor 120 proceeds to demodulate the received signal to recover the information signal. To demodulate, the sensor 400 must determine the modulation format (e.g. AM, or FM) of the transmitted signal, and perform a corresponding demodulation operation on the received signal via demodulator 506 of receiver 410. For example, a received FM radio analog communications signal may contain amplitude as well as frequency deviations. The amplitude variations are an artifact of the multipath in the radio channel, while the frequency deviations correspond to the FM modulation method. By demodulating the received signal, to recover the audio information signal, and then remodulating that audio information signal using FM modulation with the same modulation parameters, one creates a template signal that is relatively free of multipath.

In another embodiment, first sensor 120 has some a priori information stored therein regarding the modulation format employed by signal emitter 105, or a number of modulation formats that are known to be employed by signals of interest for a signal emitter 105 that is to be located. For example, the modulation format of a standard digital television signal is known; the modulation formats of various mobile telephony signals are known; the modulation formats of various standard wireless network signals are known, etc. In another embodiment, first sensor 120 receives the demodulation format in advance from central controller 50. Other methods of determining the correct modulation format are possible.

Standard receiver algorithms may be used to perform synchronization and equalize the received signal (zero forcing, decision directed feedback, etc.); track the carrier frequency, track the symbol timing, and finally recover the transmitted symbols.

In digital communications systems, the received symbols typically are encoded with error correction codes and interleaving (channel coding) and encryption. In many cases, error correction codes and interleaving are applied "downstream" of the encryption during transmission. If the error correction decoding and interleaving process is known to first sensor 120 (e.g., because the received signal conforms to some known standard), then first sensor 120 can use this information to remove bit errors in reception. The corrected bits can then be used to form a better template of the transmitted signal. Furthermore, if data formatting is performed at signal emitter 105, and this data formatting is known by first sensor 120, then sensor 120 can recover the original information bits.

Based on the information that is available to it, first sensor 120 follows the path of receiver 410 from right to left, as far as possible to generate information for producing a template that describes an estimate of the signal transmitted by signal emitter 105. Template generator 460 then utilizes this information and reverses the direction, and from left to right, to reconstruct the template that describes an estimate of the signal transmitted by signal emitter 105. FIG. 5. illustrates via the dashed lines labeled "A" through "E" five examples of generating information for producing a template via receiver 410, and using this information to reconstruct a template that describes an estimate of the signal transmitted by signal emitter 105.

As an example, the dashed line labeled "A" illustrates one embodiment of a process for generating a template waveform for a signal received at sensor 120 having a known modulation format (e.g., QPSK) but with unknown channel coding. In that case, the template may be constructed from the signal received at a first sensor 120 as follows:

First sensor 120 applies carrier recovery, symbol timing recovery, and equalization algorithms, on the received signal and stores carrier offset, and symbol timing rate and offset.

First sensor 120 demodulates and samples the complex baseband signal.

First sensor 120 estimates the transmitted channel symbols

First sensor 120 modulates the estimated transmitted channel symbols; including carrier recovery and timing recovery data. This forms a complex baseband template describing an estimate of the signal transmitted by signal emitter 105.

This template can then be distributed to the remaining sensors 110, 130, 140, 150. The template is cross correlated with the signal received at all sensors to produce cross-correlation data which may be used in a geolocation algorithm (e.g., TDOA; cross-correlation of RSS) employed by system 400 to determine the location of signal emitter 105.

It is noted that the number of template-sensor pairs is M, where M is the number of sensors, while the number of possible sensor-sensor cross correlation pairs is $M*(M-1)/2$. For large M, this can be a dramatic reduction in the number of cross correlations performed.

It is noted that the information needed to create the template is the demodulated symbols, knowledge of the modulation type, synchronization information, and optionally more detailed knowledge of the coding. Only the template itself, or information sufficient for reconstructing the template at each of the second sensors, must be shared with the second sensors 110, 130, 140 and 150. This can provide a dramatic reduction in communications bandwidth needed for system 400, as will be shown below.

The template clearly will have a delay, carrier phase, and amplitude ambiguity with respect to the original transmitted signal. However, since differences between either the signal strengths or the arrival times of received signals form the basis of the algorithms described above which employ cross-correlations, these ambiguities should be irrelevant.

In the cases illustrated with the dashed lines "B," "C," "D," and "E" in FIG. 5, receiver 410 has sufficient information to perform additional processing on the estimated transmission symbols to produce encrypted data ("B"), decrypted data ("C"), decoded data ("D") and original information bits ("E").

In some embodiments, for low bandwidth communications, the first sensor 120 may not communicate the template itself, but may instead only determine the information sufficient for reconstructing the template (e.g., samples of the estimated transmission symbols), and may communicate this information to the second sensors, each of which then reconstructs the template itself using template generator 460. In some embodiments, the second sensors may employ the received information to generate a template as a complex modulated baseband signal, and may perform the cross-correlation with the received signal at that level. For example, in some embodiments where the first sensor performs error correction and deinterleaving on the received signal to produce a template that comprises samples of the estimated decrypted data. The first sensor communicates the samples of decrypted data to the second sensors, along with information sufficient for reconstructing the complex baseband template. All sensors then reconstruct an estimate of the complex baseband template. All sensors then perform cross-correlation of the received complex baseband signal with the complex baseband template based on the decrypted data. In other embodiments, the second sensors may process the received signal to the same level as the information received from the first sensor and perform the cross-correlation at that level. For example, in some embodiments where the first sensor performs error correction and deinterleaving on the received signal to produce a template that comprises samples of the estimated decrypted data, then the second sensors may each perform error correction and deinterleaving on the received signal and then perform cross-correlation with the template based on the decrypted data. Many such variations are possible.

In a high-bandwidth case, each sensor may communicate to central controller 50 an entire set of cross-correlation data for the signal received at that sensor via network interface 440 and network 30. Central controller 50 may then process the cross-correlation data according to one or more geolocation algorithms (e.g., TDOA, cross-correlation RSS) to determine the location of signal emitter 105.

In another high-bandwidth case, each sensor may communicate to central controller 50 the signal received at that sensor via network interface 440 and network 30. Central controller 50 may then create a template from the "best"

observation, compute the cross correlation of that template with the signal from each sensor, then process the cross-correlation data according to one or more geolocation algorithms (e.g., TDOA, cross-correlation RSS) to determine the location of signal emitter 105.

For low bandwidth communications, each sensor may communicate to central controller 50 only a set of peaks from a local cross-correlation, $R_{XT}(\tau)$, of its acquired signal with the template waveform. Central controller then processes the cross-correlation features according to one or more geolocation algorithms (e.g., TDOA, cross-correlation RSS) to determine the location of signal emitter 105.

In alternative embodiments of system which do not include a separate, dedicated central controller 50, the sensors may all communicate their cross-correlation data or features to one of the sensors that is assigned to perform the geolocation signal processing to locate signal emitter 105.

Roughly speaking, the ratio of peaks from cross correlation data at second sensor 110, $R_{110T}(\tau)$, with peaks from cross correlation data at second sensor 130, $R_{130T}(\tau)$, are independent of ambiguities in the template signal T produced by the first sensor 120.

This can be seen by:

$$R_{110T}(\tau 1) \sim r_{110}(t-\tau 1) r_T(t) \Sigma(xxx) \quad (9)$$

$$R_{130T}(\tau 1) \sim r_{130}(t-\tau 1) r_T(t) \Sigma(xxx) \quad (10)$$

So the ratio of $R_{110T}(\tau 1)/R_{130T}(\tau 1)$ reduces to $\sim r_{110}(t-\tau 1)/r_{130}(t-\tau 1)$ As explained above, in some embodiments, the communications bandwidth required for operation of system 400 which employs a template of the transmitted signal can be reduced compared to a system where each sensor communicates samples of its received signal to other sensors for cross-correlation. For example, consider an embodiment where the first sensor 120 demodulates the received signal to produce estimates of the transmission symbols, and then communicates samples of the estimated symbols to the other ("second") sensors 110, 130, 140, and 150. Let:
M=Number of Sensors
N=Samples of acquired signal
L=Samples of channel symbols (L<<N)
C=Number of cross correlation peaks of interest (C<<L)

In that case, Table 1 below compares the bandwidth requirements for: (1) a system where each sensor communicates samples of its received signal to other sensors for cross-correlation; and (2) a prior art system 400 which employs a template of the transmitted signal, as explained above:

TABLE 1

| SYSTEM | DATA BANDWIDTH REQUIREMENTS |
| --- | --- |
| Prior Art | Order (N * M) |
| System 400 | Order (L * M) + Order(C) => Order(L * M) |

Since N>>L, it can be seen that the communication bandwidth requirements are reduced by transmitting the template to all sensors, instead of the received signal from each sensor to all of the other sensors.

In a multipath environment, the multipath in a received signal degrades its use as a good matched filter for the transmit signal. This is especially true when the smallest multipath delay differences are less than the reciprocal bandwidth of the transmitted signal. In this case the cross correlation peaks from multipath are smeared together and difficult to distinguish. In some embodiments, the template signal is free of multipath, and hence would serve as a better matched filter for cross correlation.

An additional feature is that the earliest peak in the cross correlation corresponds to the "most" direct path from the emitter to that sensor. The approach better removes timing ambiguities present in the direct cross correlation method.

Cross correlation approaches can work well for cases where the sensors receive signals with low SNR because of processing gain. All uncorrelated signals (such as noise) add incoherently while correlated signals add constructively. An additional benefit of using a template is that estimating the original signal potentially improves detection in the presence of noise. Knowing the modulation type (and potentially equalization and channel coding) is an additional constraint, and an improvement over the processing gain achieved from cross correlation of received signals alone. Interfering signals are also better rejected since, in general, the template is expected to be free of interference. In contrast, interference in the form of another RF transmission may be present at multiple sensors, and hence the standard cross correlation may form an imperfect matched filter for the desired signal.

Figure 6:
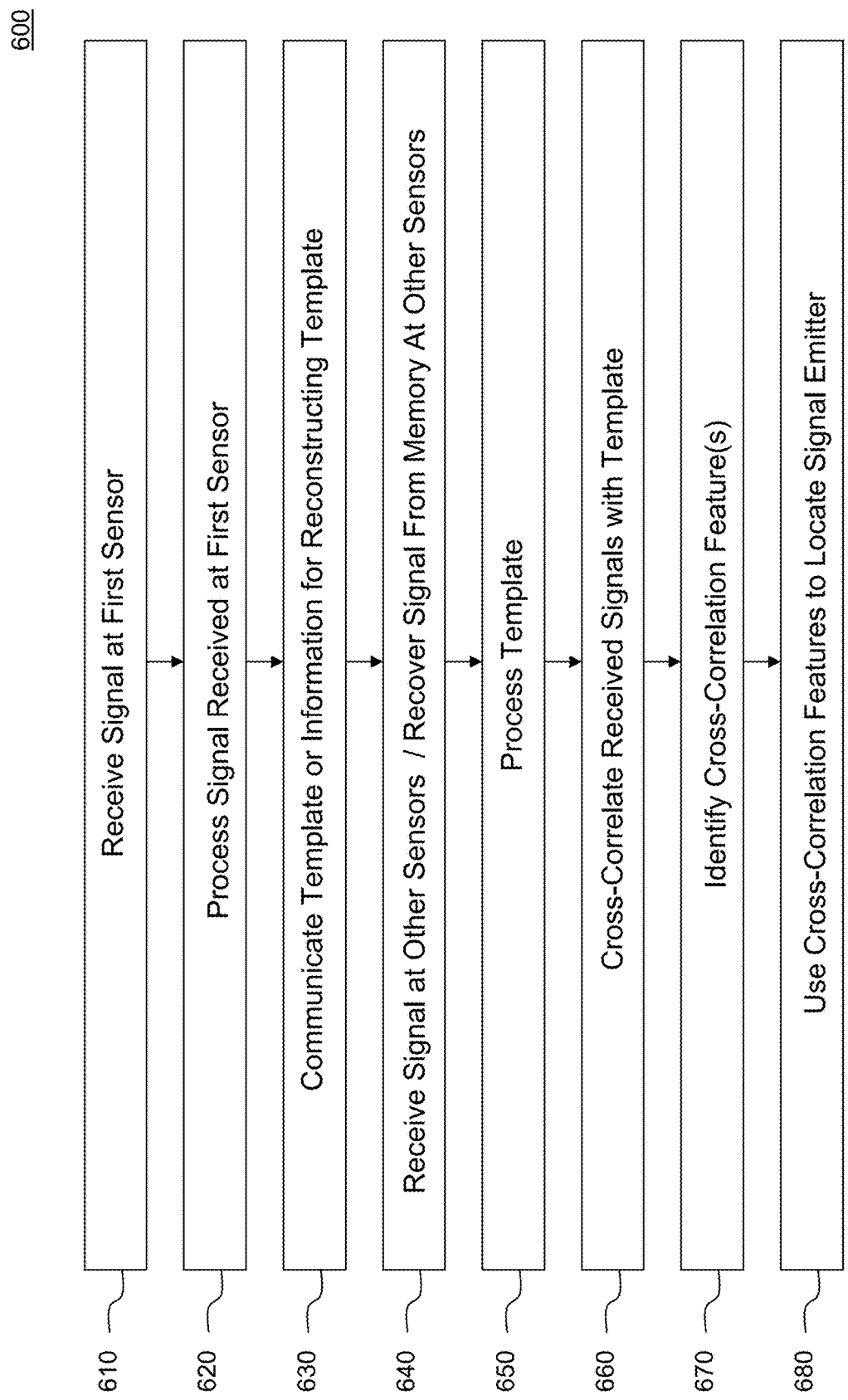
FIG. 6 is a flowchart illustrating one embodiment of a method of locating an emitter using signals received at multiple sensors.

FIG. 6 shows a flowchart of one embodiment of a method 600 of locating a signal emitter. As may be understood from the description below, one or more of the steps shown in FIG. 6 may be performed simultaneously, or in a different order than that shown.

In a step 610 a signal transmitted by a signal emitter to be located is received at a first sensor.

In a step 620 the signal received at the first sensor is processed to produce: (1) a template describing an estimate of the signal transmitted by the signal emitter; and/or (2) information sufficient for reconstructing such a template at one or more other ("second") sensors.

In a step 630 the first sensor communicates the template or information sufficient for reconstructing such a template, to the other ("second") sensors. In one embodiment, this is communication performed via network interface 440 and network 30. In one embodiment, the first sensor transmits the template or template information directly to one or more other ("second") sensors. In another embodiment, the first sensor transmits the template or template information to a central controller of the geolocation system and the central controller relays the template or template information to the other ("second") sensors.

In a step 640, the other ("second") sensors receive the signal transmitted by the signal emitter.

In a step 650 at each second sensor, and the first sensor, the template or information sufficient for reconstructing the template is processed to prepare the template for cross-correlation with the received signal. Depending on the nature of the template, the downconverted and digitized received signal may be directly correlated with the template (i.e., when the template is a reconstructed estimate of the transmitted signal), or it may be as complicated as applying interleaving and forward error correction to produce data bits (when the template is an estimate of the original data bits at the signal emitter) then modulating those bits using the detected modulation format, and synchronizing the process with the sensor's oscillators using the carrier tracking and symbol timing information, and compensating for frequency offsets between the "first" sensor and "second" sensors' oscillators using synchronization information. In one embodiment, the template comprises samples of estimates of the symbols of the signal transmitted by the signal emitter. In that case, the processing may comprise modulating the template symbols to produce modulated symbols to be cross-correlated with the received signal.

In a step 660 the processed signal for each sensor is cross-correlated with the template to produce a cross-correlation result In a step 670 one or more desired cross-correlation features are identified. In general, one or more cross-correlation peaks are identified in the cross-correlation result, along with one or more pertinent characteristics of each cross-correlation peak. For example, in a geolocation system that employs a TDOA algorithm, the time at which the cross-correlation peaks occur would be desired features of the cross-correlation result. In another example, in a geolocation system that employs a cross-correlation of RSS algorithm, the amplitudes of the cross-correlation peaks would be desired features of the cross-correlation result.

In another embodiment to that shown in FIG. 6, each sensor may communicate to the central controller the signal received at that sensor. This may be done, for example, in response to a synchronization signal communicated from the central controller to the sensors. The central controller may then create a template from the "best" observation, compute the cross correlation of that template with the signal from the other sensors, then process the cross-correlation data according to one or more geolocation algorithms (e.g., TDOA, cross-correlation RSS) to determine the location of signal emitter.

Figure 7:
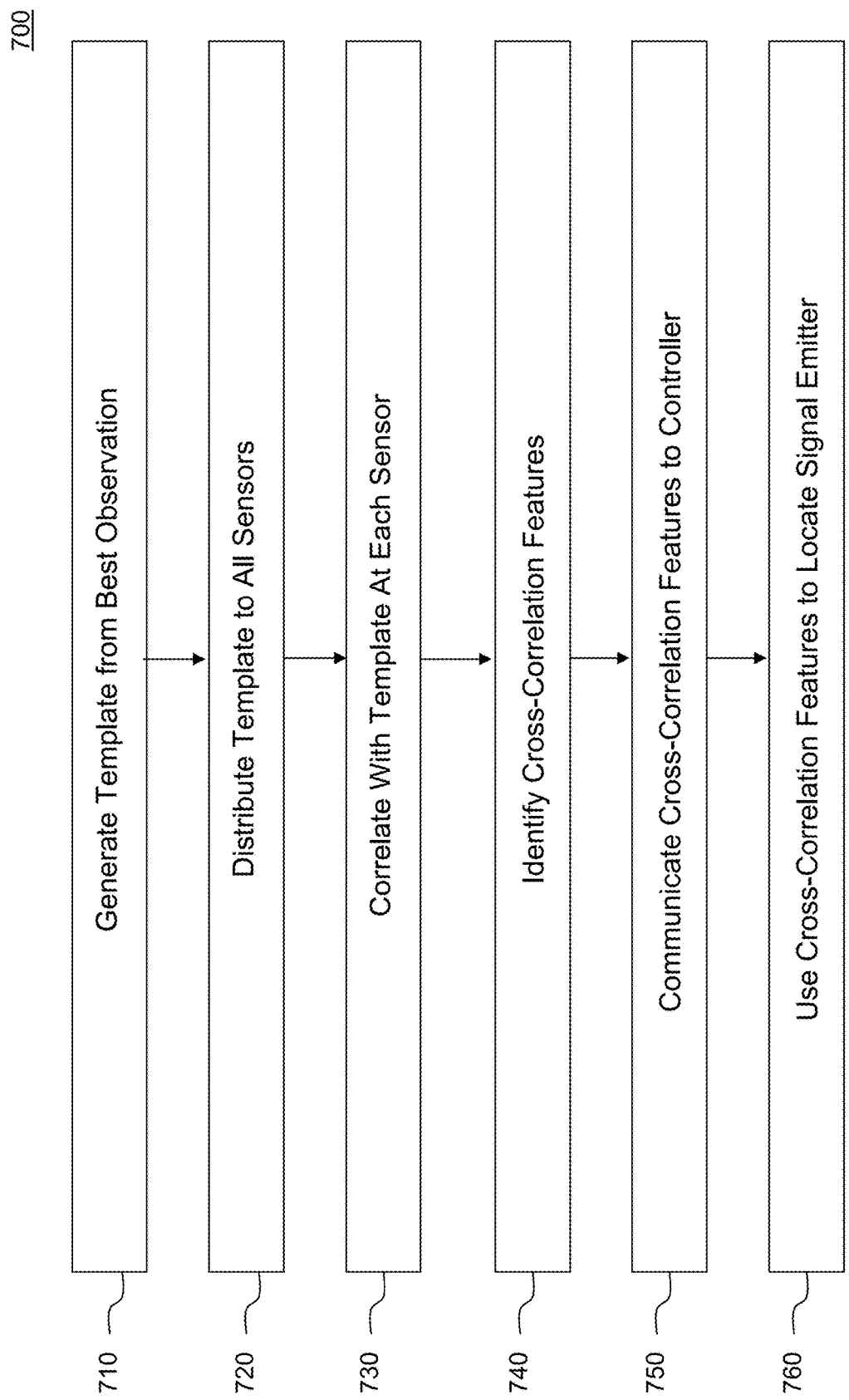
FIG. 7 is a flowchart illustrating another embodiment of a method of locating an emitter using signals received at multiple sensors.

FIG. 7 is a flowchart illustrating another embodiment of a method 700 of locating an emitter using signals received at multiple sensors. As may be understood from the description below, one or more of the steps shown in FIG. 7 may be performed simultaneously, or in a different order than that shown.

In a step 710, a template of the transmitted signal is generated from the best observation of the transmitted signal—i.e., from the signal received at the sensor which receives the "best" observation of the transmitted signal.

In a step 720, the template is distributed to the other sensors in the geolocation system.

In a step 730, the template is correlated with the received signal at each sensor.

In a step 740, cross-correlation features are identified for each cross-correlation result.

In a step 750, the sensors all communicate their cross-correlation features to a central controller of the geolocation system.

In a step 760, the cross-correlation features are used to locate the signal emitter.

Figure 8:
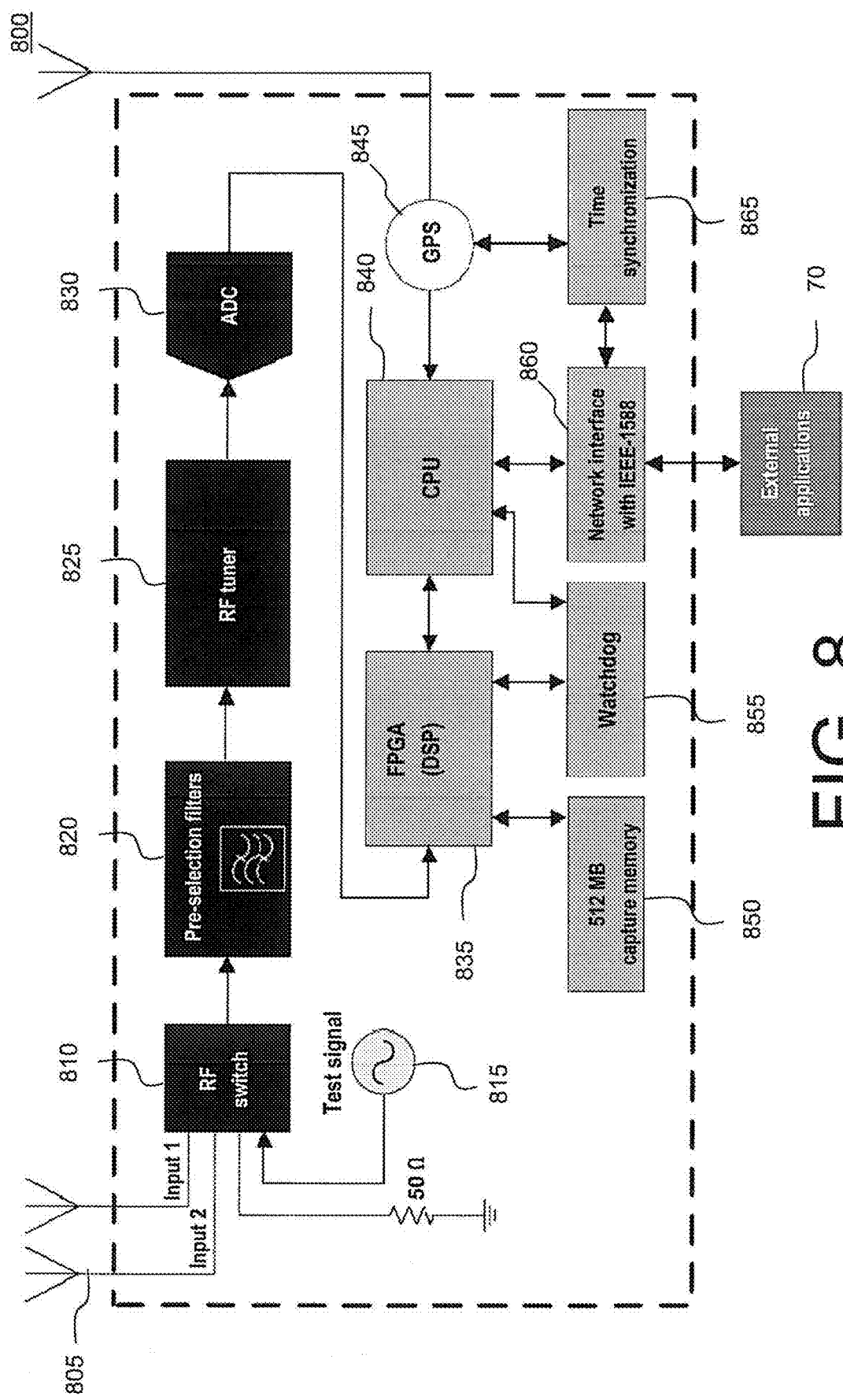
FIG. 8 is a detailed block diagram of one embodiment of a sensor that may be employed in a system for locating a signal emitter.

FIG. 8 is a detailed block diagram of one embodiment of a sensor 900 that may be employed in a system for locating a signal emitter as described above.

Sensor 800 includes one or more antennas 805, an RF switch 810, a test signal generator 815, pre-selection filters 820, an RF tuner 825, an ADC 830, a field programmable gate array 835, a central processing unit 840, a global positioning system receiver 845, a capture memory 850, a watchdog timer 855, an IEEE-1588 network interface 860 for interfacing with external applications 70, and a time synchronization module 865. The RF switch 810 allows on board diagnostics and self calibration of the internal RF signal path in conjunction with the test signal generator 815, reducing the need for on-site troubleshooting. The RF switch 810 also supports multiple external antennas for antenna diversity. The pre-selection filters 820 and RF tuner 825 filter and downconvert the RF signal to an intermediate frequency (IF) which is sampled by the ADC 830. Through further processing in the FPGA 835, that sampled signal is converted to a I/Q (in phase/quadrature) complex baseband signal and stored in capture memory 850. For the purposes of this application, that complex baseband signal is often referred to as the "received" signal. The RF Sensor operates on a TCP network, wired or wireless, and can execute tasks loaded and controlled by external applications. These tasks can be changed dynamically as monitoring requirements change. High precision clock synchronization 865 of data is provided by the network interface 860 through IEEE 1588, a Precision Time Protocol. Alternatively, the optional integrated GPS 845 is used for time synchronization. Signal detection and geolocation tasks may reside on the sensor's CPU 840, or may alternately reside in an external application 70, hosted on an application server. In particular, the template generator of this embodiment may reside on the sensor's CPU 840, or on an external application server.

While example embodiments are disclosed herein, one of ordinary skill in the art appreciates that many variations that are in accordance with the present teachings are possible and remain within the scope of the appended claims. In particular, some exemplary embodiments were described above with respect to RF or microwave emitters and sensors. However, the principles set forth above can be applied to a variety of different signals other than RF or microwave signals, including other electromagnetic signals, and acoustic signals. In addition, the description above describes things in two dimensions, but the principles could be generalized to three dimensions. The invention therefore is not to be restricted except within the scope of the appended claims.

The invention claimed is:

1. A method of determining a location of a signal emitter, the method comprising:
    receiving at each of three or more of sensors a received signal corresponding to a signal transmitted by the signal emitter;
    processing a first of the received signals received at a first of the sensors to produce a template waveform describing an estimate of the signal transmitted by the signal emitter, the first of the received signals being relatively free of noise, interference, and multipath effects so that a modulation protocol may be recognized, and the first of the received signals can be demodulated;
    communicating one of: (1) the template waveform; and (2) information sufficient for reconstructing the template waveform, to second sensors, the template waveform having a lower communication bandwidth requirement compared to the received signal,
    wherein processing the first of the received signals to produce the template waveform comprises despreading the received signal and processing the despread signal to produce estimates of symbols used to generate the transmitted signal; the information sufficient for reconstructing the template waveform comprises the estimated symbols, a spreading code for the transmitted signal, and a phase of the spreading code relative to the estimated symbols;
    cross-correlating the template waveform with at least three of the received signals received at the sensors;
    identifying at least one cross-correlation feature from each cross-correlation; and
    using the cross-correlation features to determine the location of the signal emitter.

2. The method of claim 1, further comprising communicating the received signals from the first sensor and another of the sensors to a common controller, and wherein the common controller selects which of the received signals to process to produce the template waveform, and wherein the common controller produces the template waveform from the selected received signal.

3. The method of claim 1, wherein the signal transmitted by the signal emitter is produced by digital modulation of a carrier with a digital information signal.

4. The method of claim 1, wherein processing a first of the received signals received at the first of the sensors to produce the template waveform includes identifying synchronization information and transmitter impairments in the transmitted signal and including the synchronization information and emulating the transmitter impairments in the template waveform.

* * * * *